(12) United States Patent
Wu

(10) Patent No.: US 6,568,094 B2
(45) Date of Patent: May 27, 2003

(54) COMPACT OPTICAL CALIBRATING APPARATUS FOR MULTIPLE ORIENTATIONS

(76) Inventor: Chyi-Yiing Wu, 3F, No. 48, Shih-Ping Street, Taipei (TW)

(*) Notice: Subject to any disclaimer, the term of this patent is extended or adjusted under 35 U.S.C. 154(b) by 0 days.

(21) Appl. No.: 10/035,869

(22) Filed: Dec. 28, 2001

(65) Prior Publication Data

US 2002/0092185 A1 Jul. 18, 2002

(30) Foreign Application Priority Data

Jan. 12, 2001 (TW) .................................... 90200593 U

(51) Int. Cl.$^7$ ..................... G01C 15/02; G01C 15/10
(52) U.S. Cl. ........................ 33/281; 33/283; 33/286; 33/227
(58) Field of Search .................... 33/227, 228, 276, 33/277, 278, 280, 281, 282, 283, 285, 286, 290, 291, DIG. 21, 391, 397

(56) References Cited

U.S. PATENT DOCUMENTS

| 5,144,487 A | * | 9/1992 | Hersey ................... 33/DIG. 21 |
| 5,212,889 A | * | 5/1993 | Lysen .......................... 33/286 |
| 5,218,770 A | * | 6/1993 | Toga ............................ 33/276 |
| 5,287,627 A | * | 2/1994 | Rando ......................... 33/227 |
| 5,459,932 A | * | 10/1995 | Rando et al. ................. 33/291 |
| 5,539,990 A | * | 7/1996 | Le ............................... 33/283 |
| 5,552,886 A | * | 9/1996 | Kitajima et al. .............. 33/291 |
| 5,626,424 A | * | 5/1997 | Litvin et al. ........... 33/DIG. 21 |
| 5,636,018 A | * | 6/1997 | Hirano et al. ................. 33/291 |
| 5,680,208 A | * | 10/1997 | Butler et al. .................. 33/283 |
| 5,742,387 A | * | 4/1998 | Ammann ....................... 33/290 |
| 5,790,248 A | * | 8/1998 | Ammann ....................... 33/283 |
| 5,852,493 A | * | 12/1998 | Monnin ........................ 33/291 |
| 5,955,713 A | * | 9/1999 | Titus et al. .................... 33/391 |
| 5,992,029 A | * | 11/1999 | Dong ........................... 33/227 |
| 6,035,540 A | * | 3/2000 | Wu et al. ...................... 33/286 |

* cited by examiner

Primary Examiner—Diego Gutierrez
Assistant Examiner—Madeline Gonzalez

(57) ABSTRACT

A compact optical calibrating apparatus includes: a housing having a base formed on a bottom of the housing, a horizontality calibrator universally pendulously mounted in the housing, a plurality of illuminators embedded or secured in a plumb pendulously secured to the horizontality calibrator, and a switch device pivotally secured in the housing for switching on or off a power source supplied to the illuminators and for braking or releasing the pendulous movement of the plumb; whereby upon embedding of the illuminators in the plumb, the height and volume of the calibrating apparatus is decreased for obtaining a compact optical calibrating instrument.

4 Claims, 12 Drawing Sheets

COMPACT OPTICAL CALIBRATING APPARATUS FOR MULTIPLE ORIENTATIONS

BACKGROUND OF THE INVENTION

A conventional laser beam level instrument is quite complex for its structure or mechanism and also occupies a larger volume.

The automatic optical levelling, plumbing and verticality-determining apparatus of U.S. Pat. No. 6,035,540 also granted to the same inventor of this application includes a frame (3) for securing the illuminators (6, 7, 8) and the plumb device (4) on the frame (3) rotatably mounted on the base (1), easily causing precision problem by such a rotatable mechanism; and a longer stem (42) for mounting the plumb device (4) on the stem on the frame (3), thereby increasing the total height of the instrument and causing unstable standing and inconvenient handling of the instrument.

The present inventor has found the drawbacks of the conventional laser levelling or calibrating instrument and invented the present compact optical calibrating apparatus.

SUMMARY OF THE INVENTION

The object of the present invention is to provide a compact optical calibrating apparatus including: a housing having a base formed on a bottom of the housing, a horizontality calibrator universally pendulously mounted in the housing, a plurality of illuminators embedded or secured in a plumb pendulously secured to the horizontality calibrator, and a switch device pivotally secured in the housing for switching on or off a power source supplied to the illuminators and for braking or releasing the pendulous movement of the plumb; whereby upon embedding of the illuminators in the plumb, the height and volume of the calibrating apparatus is decreased for obtaining a compact optical calibrating instrument.

DETAILED DESCRIPTION

Figure 1:
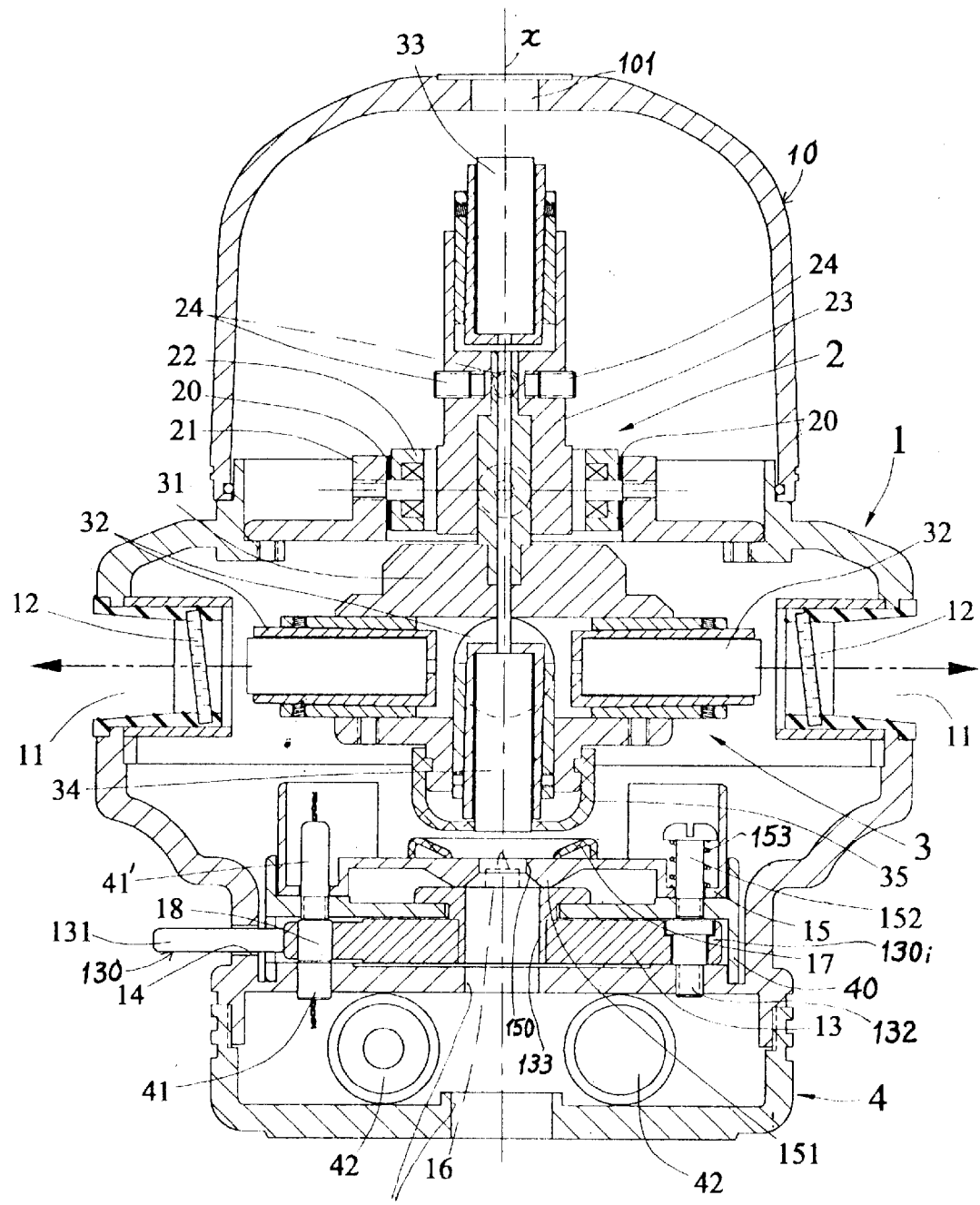
FIG. 1 is a sectional drawing of the present invention.

As shown in FIGS. 1~5, the present invention comprises: a housing 1; a horizontality calibrator 2 universally pendulously mounted in the housing 1; an illuminating means 3 secured on the horizontality calibrator 2; and a power source 42 formed in a base 4 formed on a bottom of the housing 1 for powering the illuminating means 3. The illuminating means 3 includes plural illuminators which may be laser illuminators.

The housing 1 includes: an upper cover 10 encasing the upper portion of the base 4, having a plurality of windows 11 circumferentially formed through a middle portion of the housing 1.

A switch device 13 is pivotally secured in a lower portion of the housing 1 or in the base 4 for switching on or off of the power source 42 supplied to the illuminating means 3 and for braking or releasing the pendulous movement of the illuminating means 3 as secured on the horizontality calibrator 2.

The horizontality calibrator 2 includes: a bracket 21 secured on an upper portion of the housing 1, a sleeve member 22 pivotally secured in the bracket 21 by a pair of outer pivots 221 diametrically disposed on opposite sides of the sleeve member 22, an axial rod 23 concentrically secured in the sleeve member 22 about a longitudinal axis X of the calibrator 2 by a pair of inner pivots 231 diametrically disposed on opposite sides of the axial rod 23 to be projectively perpendicular to the pair of outer pivots 221, and a plurality of adjusting screws 24 each rotatably engaged in a screw hole 241 radially formed in the axial rod 23 for adjusting gravity center (horizontality) of the calibrator 2 and the illuminating means 3 secured on the calibrator 2 to coincide the longitudinal axis X of the calibrator 2 with a plumb line P of the calibrator 2 and the illuminating means 3 loaded on the calibrator 2.

A dampening fluid or grease 20 is filled in an interface between the axial rod 23, the sleeve member 22 and the bracket 21 for dampening the pendulous movement of the elements of the present invention.

The illuminating means 3 includes: a plurality of (or four) horizontal-line illuminators 32 horizontally radially or diagonally secured on a plumb 31 which is coaxially secured to the axial rod 23 of the horizontality calibrator 2 and pendulously hung on the calibrator 2 on the housing 1, with each horizontal-line illuminator 32 perpendicular to the longitudinal axis X of the calibrator 2 and operatively emitting a horizontal optical beam or line H, perpendicular to the plumb line P for levelling, through a transparent glass 12 inclinedly secured in each window 11 formed through the housing 1 (the inclined glass 12 provided for preventing retroreflective optical images); a lower plumb-line illuminator 34 coaxially secured in the plumb 31 to be coaxial to the longitudinal axis X of the calibrator 2 and operatively emitting a downward plumb optical beam or line D downwardly through openings formed in the relevant elements of the present invention; and an upper plumb-line illuminator 33 coaxially secured to the axial rod 23 to be coaxial to the longitudinal axis X of the calibrator 2 and operatively emitting an upward plumb optical beam or line U upwardly through a top window 101 formed in the upper cover 10, with the upper and lower plumb-line illuminators 33, 34 provided for plumbing use.

The switch device 13 includes: a lever 130 having an inner end portion 130i pivotally secured in the housing 1 by a pivot 132, a handle portion 131 formed on an outer end portion of the lever 130 and angularly moved along a slot 14 transversely cut in the base 4 of the housing 1, and a central opening 133 formed in a middle portion of the lever 130 allowing an emission of a downward plumb-line optical line D, an intermediate electric contactor 18 formed in the handle portion 131 to be electrically contacted with a lower contactor 41 electrically connected to the power source 42 which may be at least a battery and contacted with an upper contactor 41' electrically connected to the illuminating means 3, whereby upon an angular pivotal movement of the lever 130 about the pivot 132 to disconnect the intermediate contactor 18 on the handle portion 131 from the lower and upper contactors 41, 41' a power supply from the power source 42 will be switched off to turn off the illuminators 32, 33, 34 of the illuminating means 3.

The switch device 13 further includes: a pair of driving wedge portions 16 oppositely formed on a middle portion of the lever 130 to fit be engageable with a pair of follower wedge portions 151 formed on a bottom of a coupling disk 15 resiliently held on a cylindrical holder 40 formed in the base 4 of the housing 1, whereby upon a pivotal biasing movement of the lever 130 to allow the driving wedge portions 16 on the lever 130 to thrust the follower wedge portions 151 formed on the coupling disk 15 to engage a braking pad 17 formed on the disk 15 with a bottom plug 35 formed on a bottom of the plumb 31 (from FIG. 2 to FIG. 3; or from FIG. 4 to FIG. 5) to brake the plumb 31 without pendulous vibration when switching off the power source supply for a stable handling of the instrument of the present invention.

The coupling disk 15 is resiliently held on the cylindrical holder 40 by a plurality of guiding bolts 152 fixed on the cylindrical holder 40, each guiding bolt 152 having a tension spring 153 disposed thereabout to normally resiliently urge the coupling disk 15 downwardly to be tightly rested on the cylindrical holder 40 to separate the braking pad 17 from the bottom plug 35 of the plumb 31 for pendulously hanging the plumb 31 on the calibrator 2 on the housing 1.

The upper contactor 41' may be secured to the cylindrical holder 40 and connected to the illuminators by passing through a hole formed in the disk 15. The lower contactor 41 may be secured to the base 4.

Figure 2:
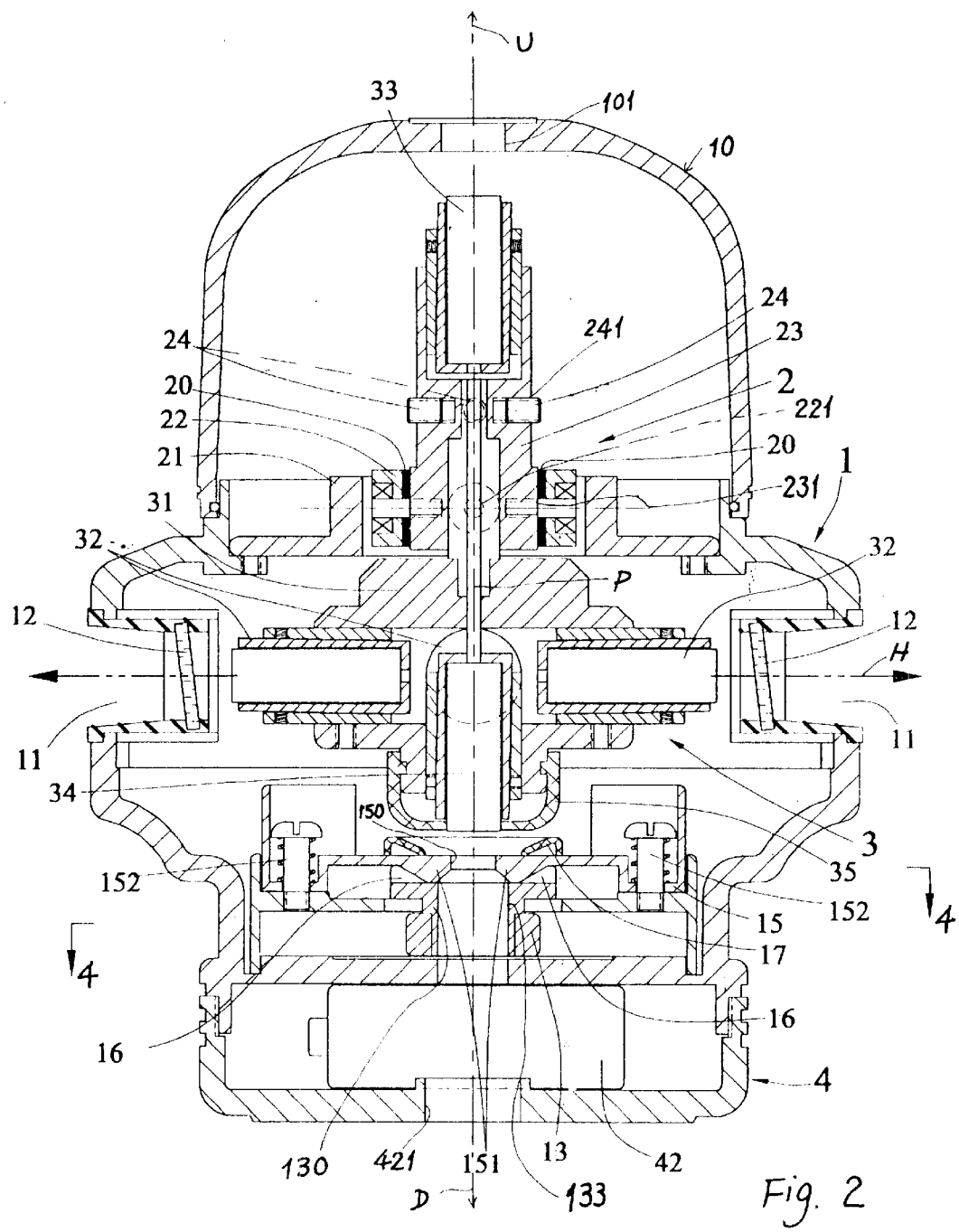
FIG. 2 is a side view of the present invention as shown in FIG. 1.
Figure 3:
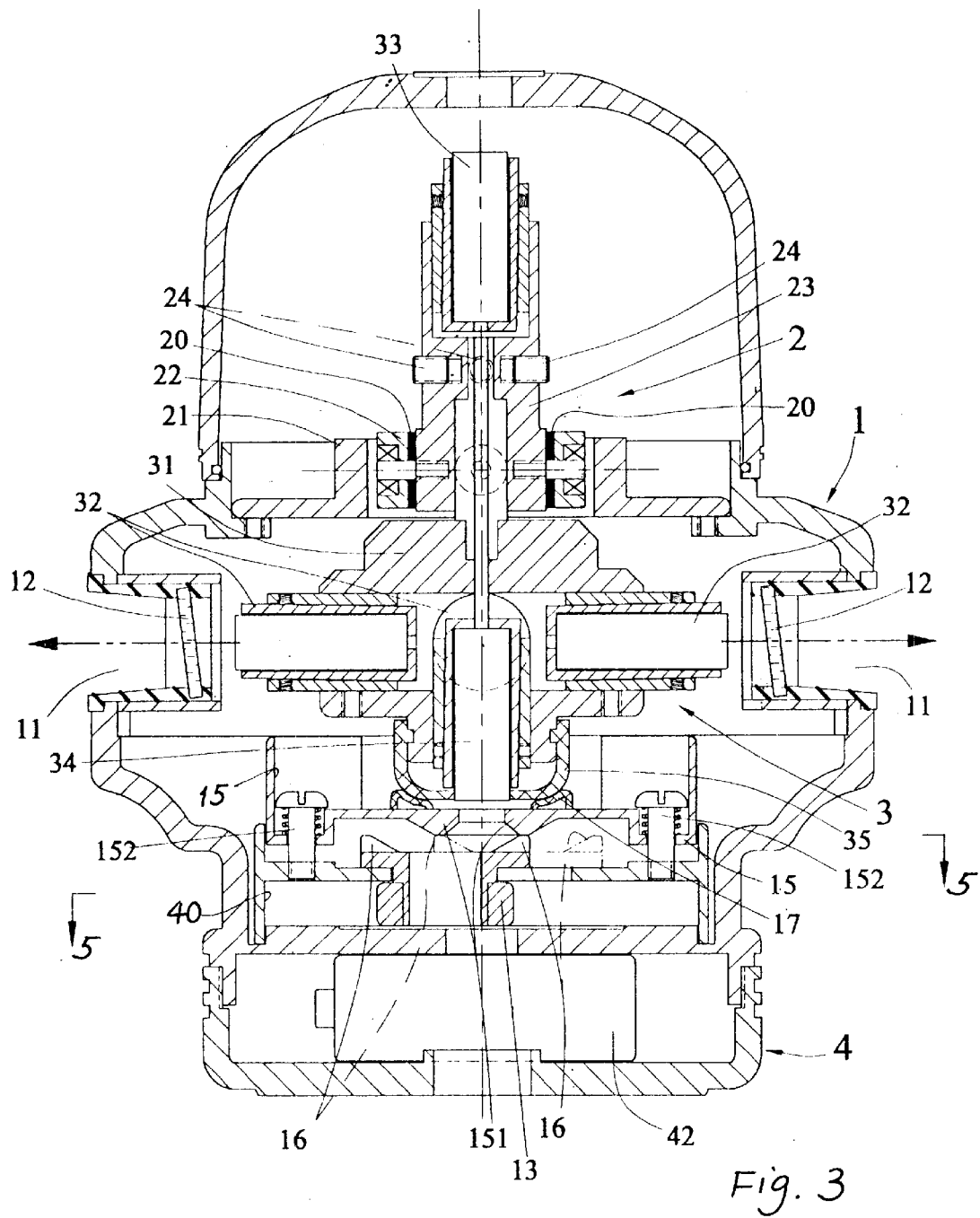
FIG. 3 is a sectional drawing of the present invention when disconnecting the power source supply from the embodiment of FIG. 1.
Figure 4:
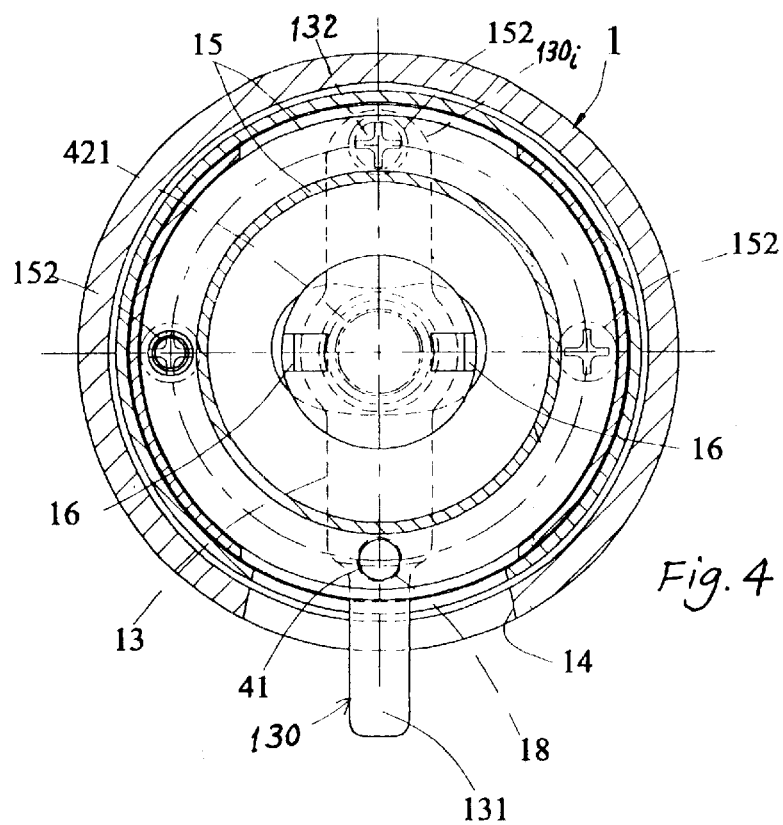
FIG. 4 is a cross sectional drawing of the present invention as viewed from 4—4 direction of FIG. 2.

The downward optical line D from the illuminator 34 is emitted through a central opening 150 in the disk 15, the central opening 133 in the lever 130 and a central hole 421 formed in the base 4 of the housing 1 to be projected downwardly as shown in FIG. 2.

The present invention discloses a plumb 31 embedded therein with several illuminators 32, 34 which also serve as a "weight" of the plumb 31, thereby minimizing the volume and shortening the height of the instrument to form a compact unit convenient for optical calibration and handling. The mechanism is simplified, while the precision of the instrument is not influenced. So, the present invention is superior to the conventional laser instruments for levelling and plumbing.

Figure 6:
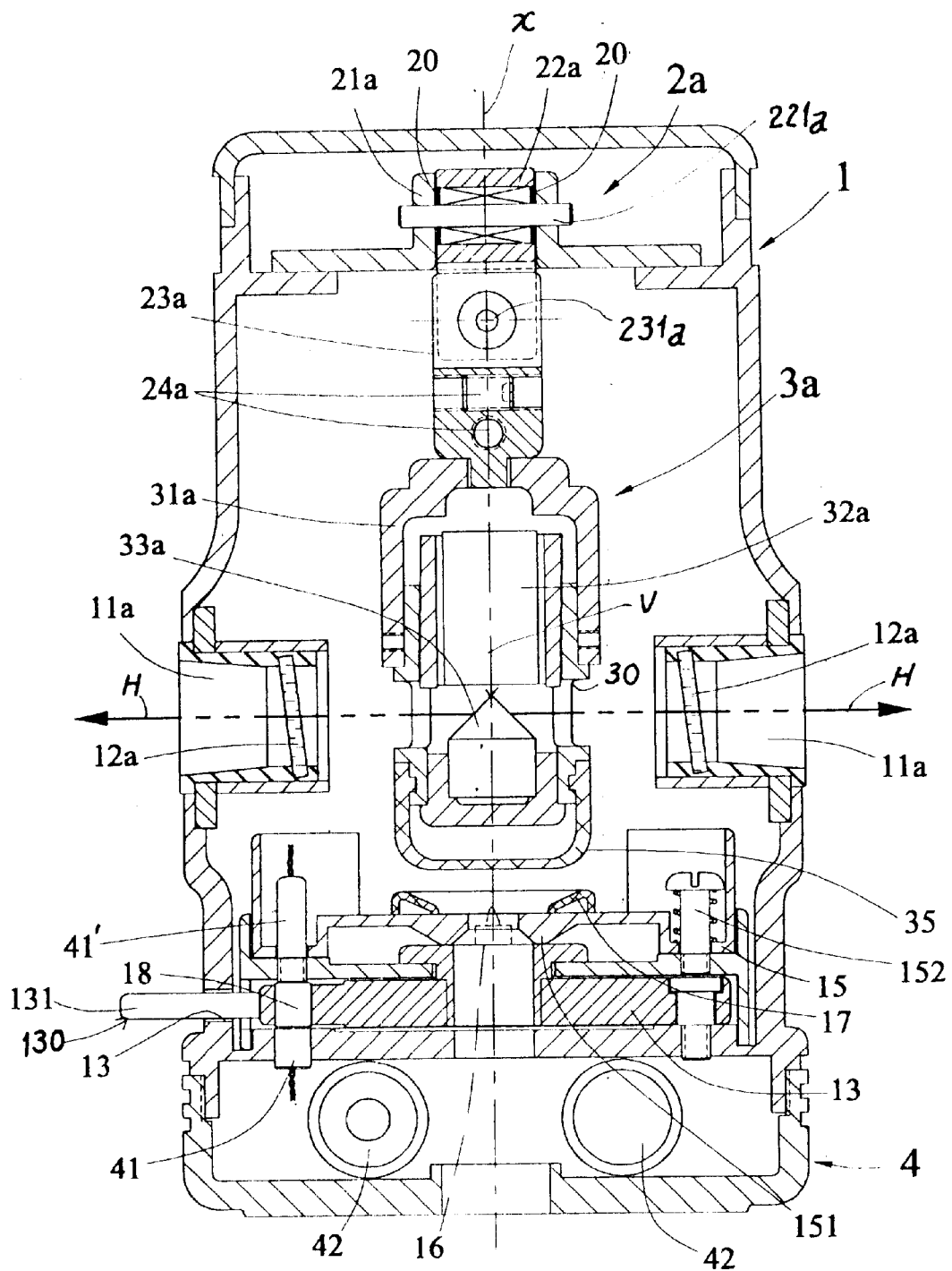
FIG. 6 is a sectional drawing of another preferred embodiment of the present invention.
Figure 7:
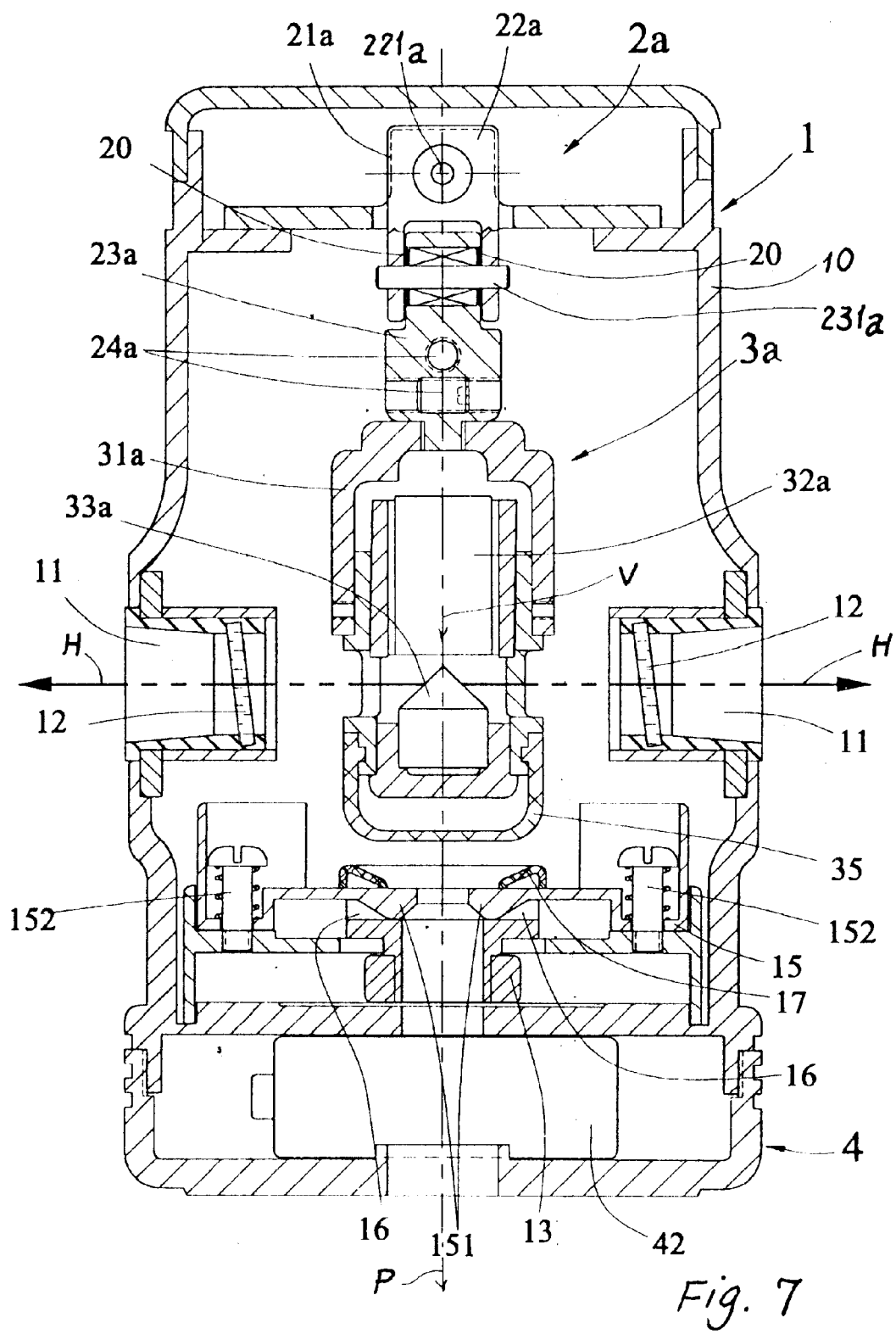
FIG. 7 is a side view of the present invention as shown in FIG. 6.

As shown in FIGS. 6, 7, the horizontality calibrator 2a has been modified from that as aforementioned to include: a bracket 21a secured on an upper portion of the housing 1, a crank-arm block 22a pivotally secured to the bracket 21a by an upper pivot 221a, a link member 23a pendulously pivotally secured to the crank-arm block 22a by a lower pivot 231a, a plurality of adjusting screws 24a each transversely rotatably secured in the link member 23a for adjusting a gravity center of the calibrator 2a on the housing 1, a plumb 31a pendulously secured to the link member 23a and defining a longitudinal axis X at a longitudinal center thereof, with the upper pivot 221a projectively perpendicularly intersecting the lower pivot 231a to be aligned with the longitudinal axis X of the plumb 31a, an illuminator 32a of the illuminating means 3a coaxially secured in the plumb 31a for emitting a vertical optical beam V aligned with the plumb line P, and a prism 33a mounted in the plumb 31a beyond the illuminator 32a for refracting the vertical optical beam from the illuminator 32a into horizontal optical lines H radially horizontally emitting through a plurality of slots 30 formed through the plumb and through the windows 11 formed through the housing 1, each window 11 having an inclined glass 12 embedded therein, adapted for levelling use.

Other configurations such as switch device 13, base 4 and batteries 42 of this embodiment (FIGS. 6, 7) may be referred to that as aforementioned and as shown in FIGS. 1~5.

Figure 8:
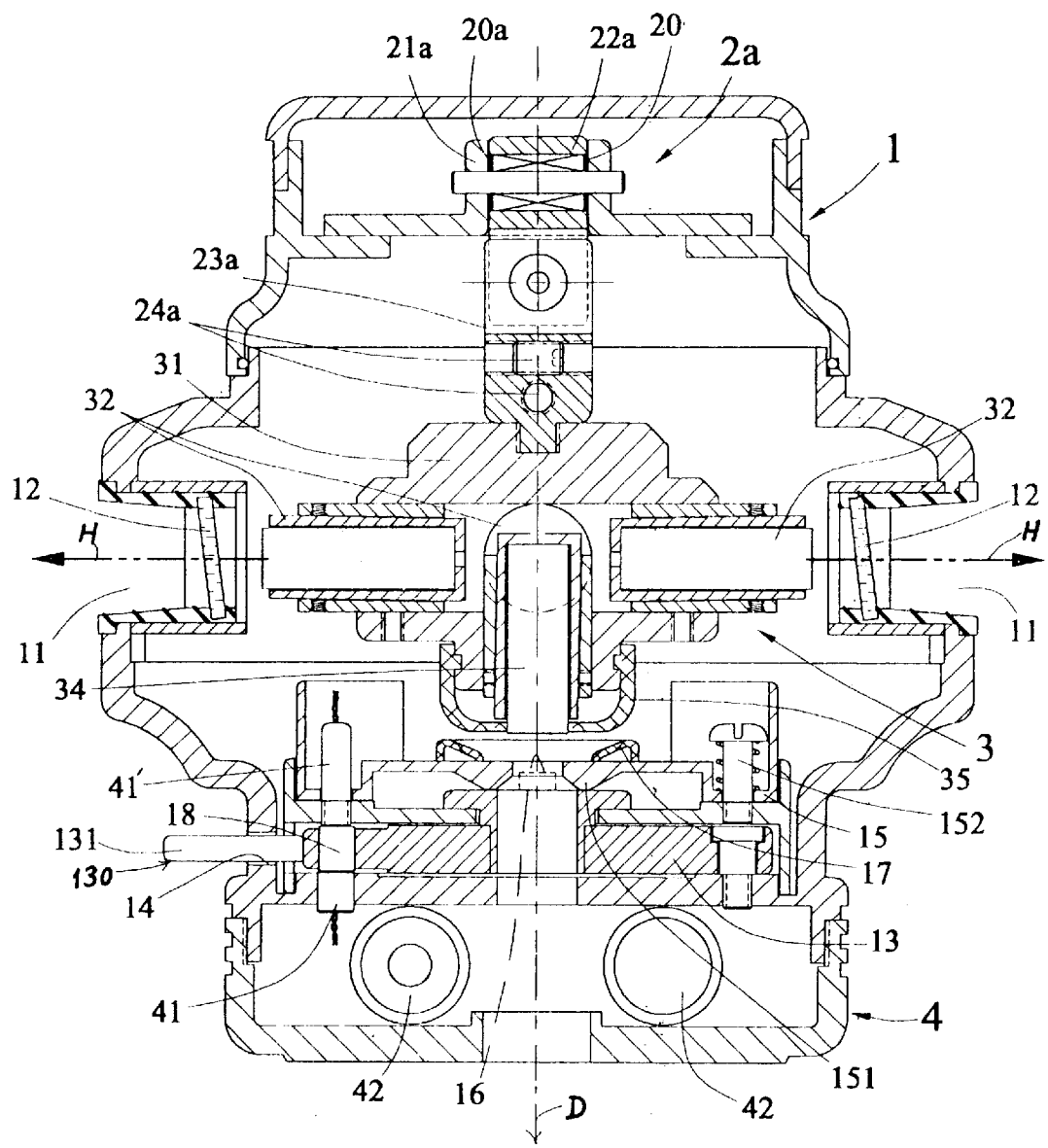
FIG. 8 shows still another preferred embodiment of the present invention.

As shown in FIG. 8, the horizontality calibrator 2a may be referred to that as shown in FIGS. 6, 7; while the other elements may be referred to the first preferred embodiment of the present invention as shown in FIGS. 1~5, except that the upper plumb-line illuminator 33 has been eliminated in FIG. 8.

Figure 9:
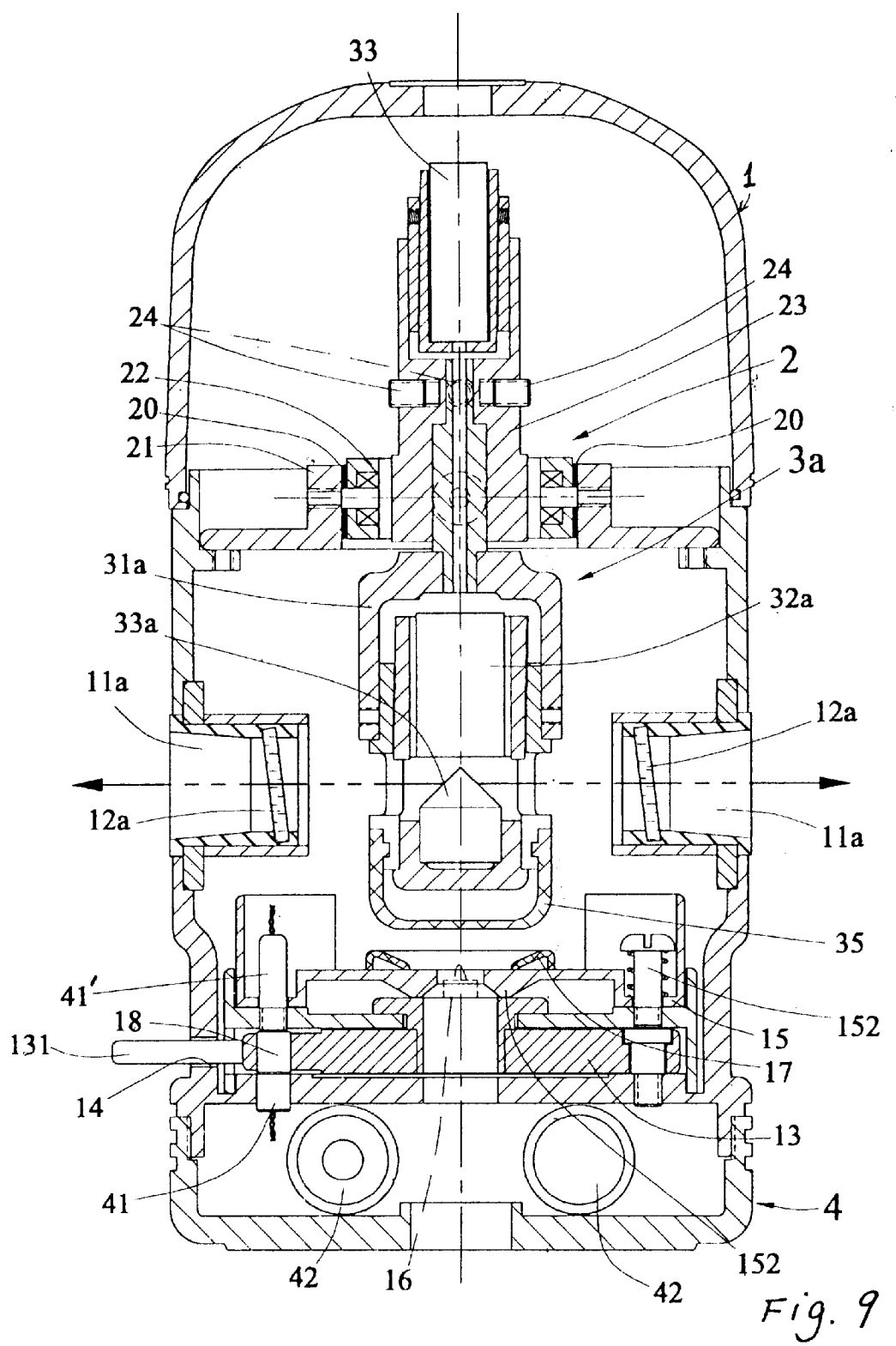
FIG. 9 shows further preferred embodiment of the present invention.

As shown in FIG. 9, the mechanism and structure are the same as that shown in FIGS. 1~5, except that the illuminator(s) embedded in the plumb 31 has (have) been modified to the illuminator 32a and prism 33a as shown in FIGS. 6, 7.

Figure 10:
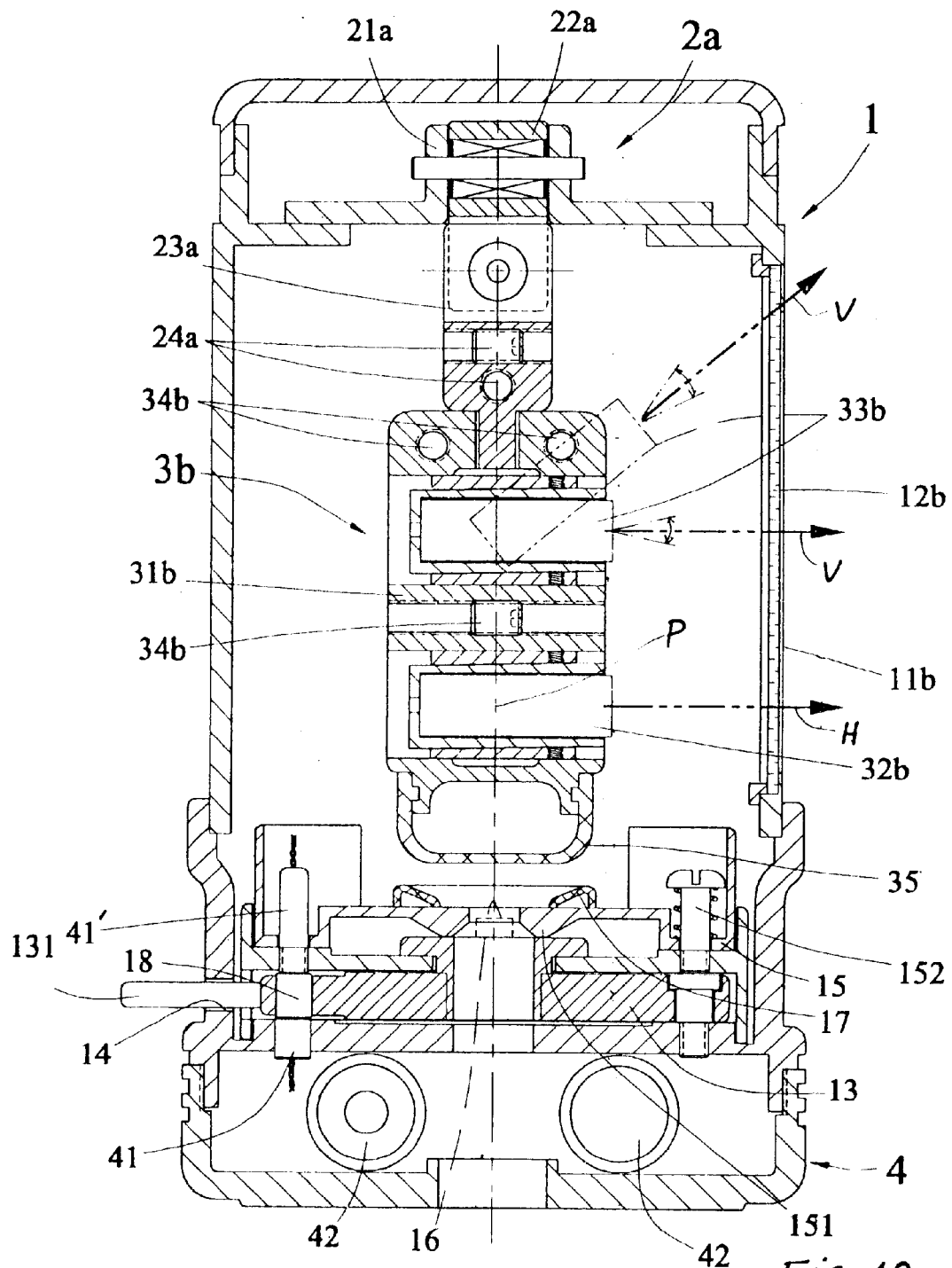
FIG. 10 shows still further preferred embodiment of the present invention.

As shown in FIG. 10, a horizontal-line illuminator 32b of the illuminating means 3b is horizontally mounted in the plumb 31b for emitting a horizontal line H and a vertical-line illuminator 33b mounted in the plumb 31b for emitting a vertical line V perpendicular to the horizontal line H and parallel to the plumb line P. Several weight screws 34b are secured in the plumb 31b to increase the weight of the plumb 31b. The vertical-line illuminator 33b may be angularly mounted in the plumb 31b as shown in dotted line (FIG. 10) for displaying the optical line image on a desired target area (not shown). Several adjusting screws 24a are provided on the calibrator 2a for adjusting a gravity center of the calibrator 2a and the plumb 31b hung thereunder to be aligned with a plumb line P of the instrument. All the optical lines V, H as emitted from the illuminators 33b, 32b will pass through a transparent window 11b formed on the housing 1.

Figure 11:
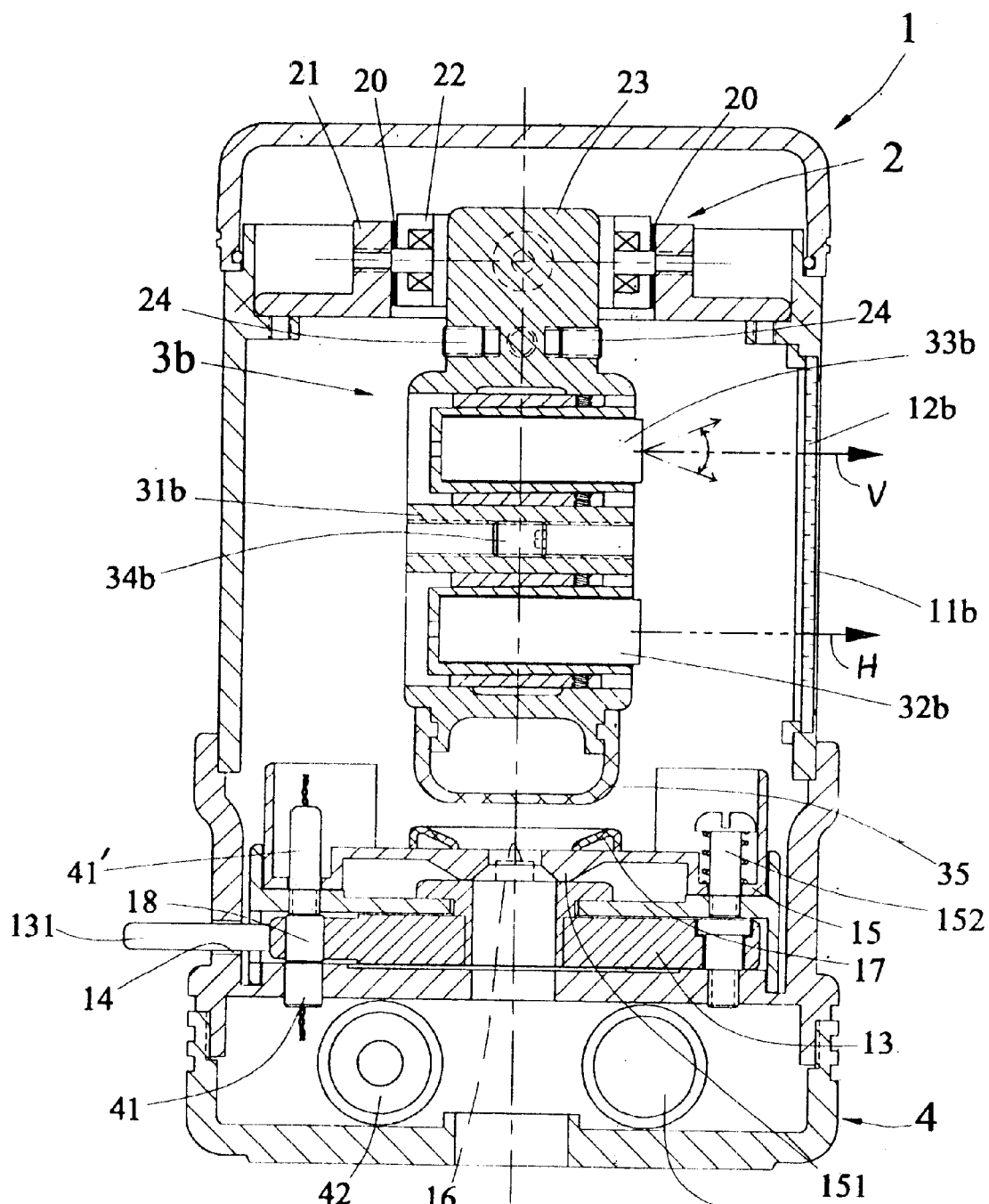
FIG. 11 shows a modification of the embodiment as shown in FIG. 10.

As shown in FIG. 11, the horizontality calibrator 2 is the same as that of the calibrator 2 as shown in FIGS. 1~5. The horizontal-line illuminator 32b and the vertical-line illuminator 33b are respectively mounted on the plumb 31b as shown in FIG. 10.

Figure 12:
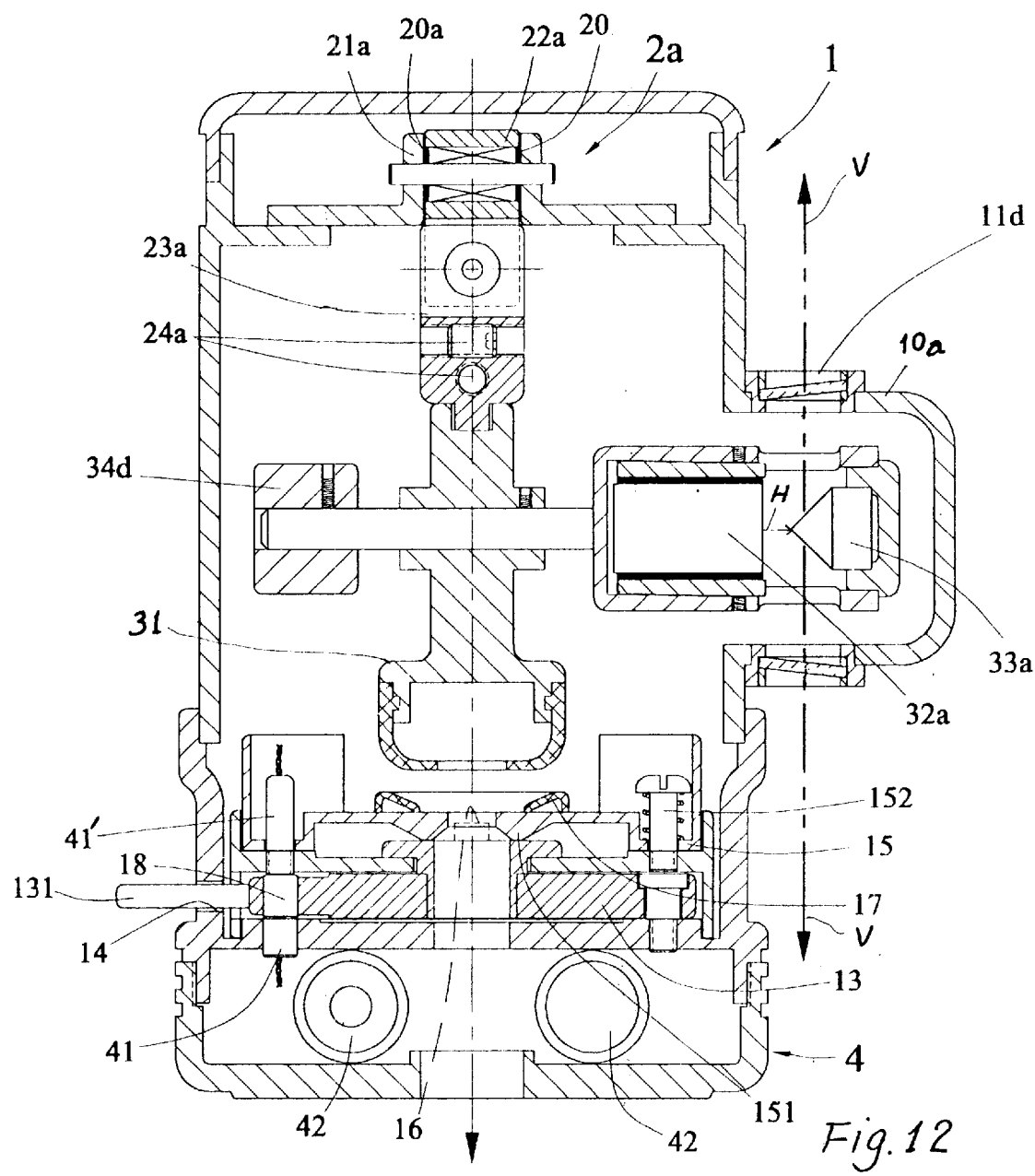
FIG. 12 shows the other preferred embodiment of the present invention.

As shown in FIG. 12, the plumb 31 has an illuminator 32a secured on a first (right) side portion of the plumb 31 for emitting a horizontal optical beam H which is then refracted into plural vertical optical lines V through a prism 33a mounted in a side casing 10a formed on a side portion of the housing 1, with the vertical optical lines V projecting towards a target wall (not shown) through plural windows 11d formed through the side casing 10a; and a counter weight 34d secured on a second (left) side portion of the plumb 31 for gravitational balance on the opposite sides of the plumb 31.

The lower portion of the housing 1 including the switch device 13, the power source 42 and other elements mounted in (or on) the base 4 as shown in FIGS. 6~12 are same or similar as that shown in FIGS. 1~5.

Figure 5:
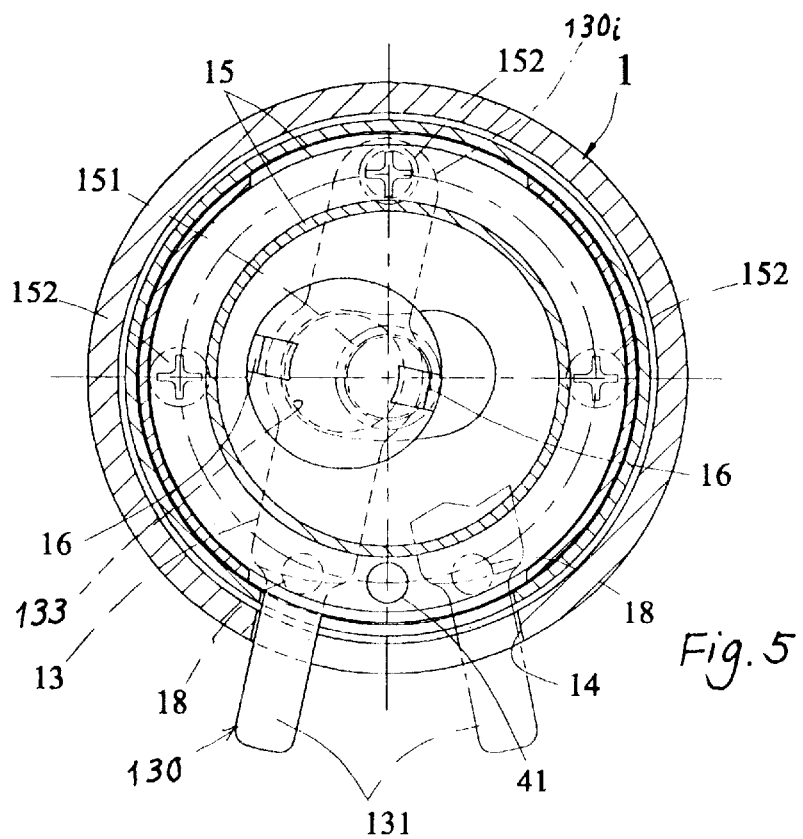
FIG. 5 is a cross sectional drawing of the present invention as viewed from 5—5 direction of FIG. 3.
Figure 13:
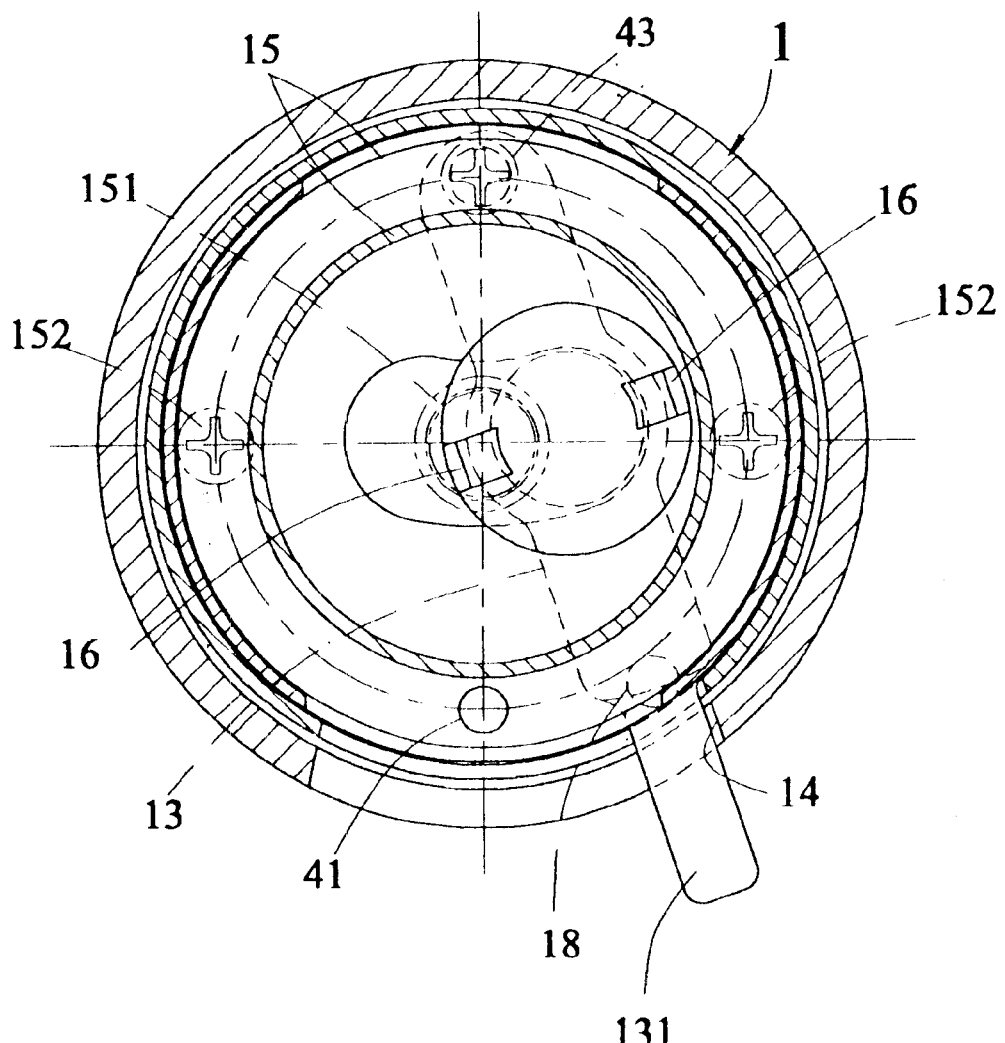
FIG. 13 is a cross sectional drawing showing different positioning of the switch device of the present invention.

As shown in FIG. 13, the switch device 13 is pivotally moved rightwardly opposite to that as shown in FIG. 5 for an alternative switching operation. By suitable modification, the switch device 13 may be designed to merely switch on or off the power source supply, not to brake the plumb 31 of the present invention by those skilled in the art.

The present invention may be modified without departing from the spirit and scope of the present invention.

I claim:

1. An optical calibrating apparatus comprising:

a housing having a base formed on a bottom of said housing and an upper cover encasing the base;

a horizontality calibrator universally pendulously mounted in said housing defining a longitudinal axis at a longitudinal center of said calibrator;

an illuminating means including a plurality of illuminators embedded and secured in a plumb pendulously hung to said calibrator; whereby upon adjusting of a gravity center of said calibrator and said illuminators loaded on said calibrator to align the gravity center with a plumb line of said calibrator and said illuminators, said illuminators respectively emit at least a horizontal optical line projectively perpendicular to said plumb line and a vertical optical line projectively parallel to said plumb line;

said housing including a switch device having: a lever with an inner end portion pivotally secured in the housing, a handle portion formed on an outer end portion of the lever and angularly moved along a slot transversely cut in the base of the housing, and a central opening formed in a middle portion of the lever allowing an emission of a downward optical line emitted from said illuminator, an intermediate electric contactor formed in the handle portion to be electrically contacted with a lower contactor electrically connected to a power source stored in said base, and contacted with an upper contactor electrically connected to the illuminating means, whereby upon an angular pivotal movement of the lever to disconnect the intermediate contactor on the handle portion from the lower and upper contactors, a power supply from the power source will be switched off to turn off the illuminators of the illuminating means.

2. An optical calibrating apparatus according to claim 1, wherein said switch device further includes: a pair of driving wedge portions oppositely formed on a middle portion of the lever to be engageable with a pair of follower wedge portions formed on a bottom of a coupling disk resiliently held on a cylindrical holder formed in the base of the housing, whereby upon a pivotal biasing movement of the lever to allow the driving wedge portions on the lever to thrust the follower wedge portions formed on the coupling disk to engage a braking pad formed on the disk with a bottom plug formed on a bottom of the plumb to brake the plumb without pendulous vibration.

3. An optical calibrating apparatus according to claim 2, wherein said coupling disk is resiliently held on the cylindrical holder by a plurality of guiding bolts fixed on the cylindrical holder, each said guiding bolt having a tension spring disposed about said guiding bolt to normally resiliently urge the coupling disk downwardly to be tightly rested on the cylindrical holder to separate the braking pad from the bottom plug of the plumb for pendulously hanging the plumb on the calibrator on the housing.

4. An optical calibrating apparatus according to claim 1, wherein said upper contactor is secured to a cylindrical holder resiliently held on said base and electrically connected to the illuminators; and said lower contactor is electrically connected to said power source in the base.

* * * * *